Patented Mar. 18, 1952

2,589,652

UNITED STATES PATENT OFFICE 2,589,652

RESIN, ABRASIVE ARTICLE INCORPORATING SAME, AND METHOD OF MAKING SAME

Hugh V. Allison, Fairfield, Conn., assignor to The Allison Company, Bridgeport, Conn., a corporation of Connecticut No Drawing. Application March 20, 1950, Serial No. 150,800

6 Claims. (Cl. 51—298)

This invention relates to new and useful improvements in resins and processes of making the same and has particular reference to a resin especially adapted for use as a bonding medium in abrasive articles.

Heretofore thin abrasive wheels, such as cutting wheels, have been manufactured using various binders or bonds such as shellac, rubber and synthetic elastomers, and synthetic resins particularly those of the alkyd and phenolic types. Each of these binders or bonding mediums gives to the complete abrasive wheel properties which govern usage of the wheel.

Rubber bonded cutting wheels are strong and can readily be manufactured very thin. Such wheels are particularly useful where strength and thinness are important factors. However, application of the rubber bonded wheels requires, generally, the use of a coolant because the rubber binder or bond softens under heat generated during use and rapid breakdown of the wheel ensues unless copious quantities of coolant are used.

Thermo setting bonding mediums or binders are heat resistant and wheels wherein the bond is thermo set, generally referred to as resinoid wheels, are satisfactorily used in the absence of coolant or for dry cutting. However, difficulties are encountered when very thin resin bonded abrasive wheels are to be manufactured. Thin resinoid bonded wheels are quite brittle and easily break down in use and thus such wheels are likely to have but a short useful life.

The need for a thin abrasive cutting wheel wherein the bond has properties intermediate between the two types of wheels mentioned above has long been recognized. Attempts to make such a product have resulted in the using of binders which are mixtures of thermo-setting and thermo-plastic materials. A specific example of such attempts is disclosed in U. S. Patent No. 1,655,396. However, the end product generally obtained by the mentioned attempts does not have the heat resistance required.

The manufacture of abrasive articles employing rubber or other elastomers, natural or synthetic, as binders or as a bonding medium and wherein articles are produced by calendering of mixtures to the desired thickness have been made. Methods along this line are quite old in the art as exemplified in the patent to Mayall, No. 27,817 of April 10, 1860.

Abrasive wheels including thermo setting resins as binders are made by placing the prepared mixture in a suitable mold and pressing or hot rolling the same to compact the mixture. This method is slow and difficulty is experienced in trying to obtain uniform distribution in the mold. The thinner the mold, the more difficult the problem. Additionally, after pressing, the green wheel must be handled with extreme care to avoid spoilage as by fracture prior to the final heat cure. Disclosure along this line is to be found in U. S. Patent Nos. 1,963,253 and 2,076,517.

According to the present invention, the production of thermo setting resin bonded thin abrasive wheels by the calender and blanking out method is simplified and made relatively easy. This is possible according to the present invention because the resin herein employed and later disclosed is both plastic and elastic at room temperature. However, upon heat treatment, the specific resin can be converted into a hard heat resistant bond suitable for use in the manufacture of resin bonded abrasive cutting wheels.

An object of the invention is to provide a resin characterized by toughness and strength, high heat resistance, and which does not become embrittled when heated even for a long period of time and which therefore when employed as an abrasive bond does not become embrittled as heat is generated during use of the abrasive article.

Another object is to provide a resin with an intermediate stage of a dough-like consistency at room temperature and into which grit may be dispersed in a mill or the like having either cool or slightly heated rolls and which resin softens while being worked.

A further object is to provide an abrasive article wherein the abrasive grains are bonded by a medium which does not become embrittled even during use and which has a tacky characteristic and thereby tightly adheres abrasive grains in the article.

Yet another object of the present invention is to provide a polyester resin which may be worked in standard equipment used in the abrasive industry. This is accomplished through the use of a particular plasticizer hereinafter disclosed, which plasticizer renders the resin in an intermediate stage workable at room temperature but which in the finally cured resin does not detract from its high heat resistant characteristics.

Other objects and advantages of the invention will become apparent from a consideration of the following detailed description wherein a satisfactory embodiment of the invention is disclosed. However, it is to be understood that the invention is not limited to the details disclosed but includes all such variations and modifications as fall within the spirit of the invention and the scope of the appended claims.

To accomplish the desired end I prepare a resin with dimethyl terephthalate, pentaerythritol, methoxy polyglycol and lead dioxide. For catalysts I use metal oxides, for example, aluminum oxides, copper oxides, lead oxides. The plasticizer employed is of particular significance and forms part of the completed plastic structure. In the present instance, this plasticizer consists of methoxy polyglycol.

It is old in the art to prepare polyester resins in conjunction with plasticizers, some of which heretofore used are triacetin, diethyl phthalate, tricresyl phosphate, indene, indene polymer, glycol diacetate, and benzyl benzoate. However, these plasticizers are detrimental to the heat softening point of the finished resin.

In making the compound, the quantity of the dimethyl terephthalate exceeds that of the pentaerythritol while the proportions of pentaerythritol to the methoxy polyglycol can be varied over a wide range depending on the mechanical properties desired in the end product. Employing the ingredients listed, the dimethyl terephthalate being employed as 400 parts, then I may us from 80 to 200 parts of pentaerythritol, from 40 to 200 parts of methoxy polyglycol, and from .4 to 4 parts of lead dioxide.

While the resin of the invention has many uses such as in the making of laminated structures or of structures requiring a tough high heat resistant bond, my particular interest is in the use of the resin as a bond for the abrasive grit or grain in abrasive articles. The resin may be thinned with heat or solvent such as alcohol, distributed over backing and employed for attaching abrasive grains to the backing as in the case of sandpaper, emery cloth, or the like. Also prior to the dough stage and while the resin is a tacky fluid, grit may be whipped into and dispersed through the resin.

However, in the making of more solid abrasive articles the resin while in its dough-like stage may be kneaded or rolled or otherwise handled to take up abrasive grit. Generally, this grit would be worked into the resin between the rolls of a mill and these rolls may be at room temperature or slightly heated as desired. The amount of abrasive grit will generally be about five times in weight the weight of the resin employed in the making of the abrasive articles by the method described.

In addition to the uses heretofore set forth, the present resin, prior to final cure, may be blended with other resins for plasticizing or tackifying other polymers and to increase their heat resistance.

In making an abrasive cutoff wheel I may employ approximately 16 ounces of abrasive grain (#60 aluminum oxide) and approximately 5 ounces of the resin in its dough-like stage and mix them together on rolls whereby to obtain a uniform dispersion of the abrasive grain through the resin. Thereafter, the abrasive grain laden resin or the mixture may be further softened by the use of additional heat and may be calendered or formed in a mold. Where the grain laden mixture is calendered the abrasive articles are cut therefrom and thereafter given a final cure. If the mixture is formed in the mold, of course the mold will be placed in a suitable chamber for further heating to completely cure the resin bond. In its finally cured state, the resin is insoluble and maintains its characteristics of toughness and strength, is not brittle, and does not become so on further heating.

As the present invention is concerned with my specific resin, a specific process of the making of the resin, and articles bonded with said resin, such specific process is given following several examples of proportions of ingredients.

*Example I*

| | Grams |
|---|---|
| Dimethyl terephthalate | 400 |
| Pentaerythritol | 136 |
| Methoxy polyglycol | 100 |
| Lead dioxide | 0.7 |

*Example II*

| | Grams |
|---|---|
| Dimethyl terephthalate | 400 |
| Pentaerythritol | 80 |
| Methoxy polyglycol | 40 |
| Lead dioxide | 0.4 |

*Example III*

| | Grams |
|---|---|
| Dimethyl terephthalate | 400 |
| Pentaerythritol | 200 |
| Methoxy polyglycol | 200 |
| Lead dioxide | 4.0 |

*Example IV*

| | Grams |
|---|---|
| Dimethyl terephthalate | 400 |
| Pentaerythritol | 136 |
| Methoxy polyglycol | 80 |
| Lead dioxide | 0.7 |

*Example V*

| | Grams |
|---|---|
| Dimethyl terephthalate | 400 |
| Pentaerythritol | 136 |
| Methoxy polyglycol | 140 |
| Lead dioxide | 0.7 |

As the methoxy polyglycol is increased in proportion to the other ingredients, the final resin is less brittle, but there is a slight lowering of the softening point. The contrary is also true that as the proportional quantity of methoxy polyglycol is decreased the resin is more brittle and its heat softening point is slightly higher. Further, as the proportional quantity of the pentaerythritol is increased and decreased, the final resin is more brittle or less brittle, respectively.

The particular steps and sequence of steps in treating these ingredients I find to be vital to the manufacture of the resin desired. Thus, the resin is made in a stainless steel vessel of peculiar design. This vessel is elongated and cylindrical, being at its open upper end of a diameter approximately equal to ⅕ the length of the tube. The vessel is closed at its lower end and open at its upper end. Heat is applied to the tube either by a jacket or heating means along its sides. This insures rapid heating of the entire mass, i. e., the contents of the vessel, for rapid reaction and minimizes loss through the exposed surface of the mass, which surface, owing to the design of the vessel, is small.

First the methoxy polyglycol is heated to the melting point and into the melted methoxy polyglycol I whip the powdered catalyst, the lead dioxide. As the catalyst is added, the melted methoxy polyglycol is being beaten by a high speed mixer whereby to secure uniform dispersion of the lead dioxide. Immediately after the catalyst has been added, I add ⅓ of the pentaerythritol to stiffen the mix to hold the catalyst in suspension. The pentaerythritol is uniformly stirred or mixed or whipped into the methoxy polyglycol and catalyst.

As a separate mix, the remainder or other ⅔ of the pentaerythritol is thoroughly and uniformly mixed with the dimethyl terephthalate and then a portion of this second mixture is added to the first mixture, the latter yet being at the melting temperature for the methoxy polyglycol. The proportion of the second mixture which is added to the first mixture is such that the resultant mix is of the consistency of a paste.

Heat is now applied to the vessel. The paste is then charged into this vessel and the remainder of the second mixture is added. As this second mixture is added into the vessel, it is stirred in to obtain a uniform mix.

The heat being applied, the temperature of the complete mix rises and a temperature rise from 30° C. to 220° C. is reached in 2½ hours.

A slight reaction was noted at 180° C. by the observance of the evolution of methyl alcohol vapor but there was not enough reaction to indicate any substantial progress toward the accomplishment of the desired polymerization and production of the desired resin. At temperatures below 180° C. the result is a waxy product rather than the tacky mass desired. To complete the reaction in a minimum of time and insure against loss of ingredients, I prefer to complete the reaction at high temperatures as up to 220° C. At the latter point, which is reached in the described work approximately 2½ hours later than the temperature 30° C. is reached, the reaction is watched closely and constant tests are made. These tests consist in letting drops of the mixture fall upon a cool aluminum surface. Initially, the drops are in a waxy state and spread out over the surface.

As the polymerization continues under the described heat, after the proper time the drops show more cohesion and tackiness and at the desired stage the reaction is halted. In my actual work the temperature of the batch had risen to 229° C. in 25 minutes from the end of the 2½ hours during which the temperature had reached 220° C.

Now the batch of material may be poured from the reaction vessel and it is poured into a container of aluminum foil. On cooling the material is a brown, amorphous, tacky resin and the yield is from 75-80%. The resin adheres to the mentioned aluminum foil container and when the resin has cooled it is in a dough-like state of sufficient rigidity or body to be handled and the foil container is stripped from the resin. This leaves the resin in a loaf-like piece.

From this stage the resin may be worked on a mill or by hand or the like to thoroughly distribute abrasive grain through it. It is an advantage of the present resin when used as a bond for abrasive grain that the resin can be worked on standard equipment without detriment to the final product. However, the resin and the resin and grain mixture has a great capacity for adhering. Therefore, when fabricating articles as, for example, an abrasive cutoff wheel, the grain laden resin mix, if calendered, is laid out on a regenerated cellulose sheet, as a sheet of cellophane. Then a second sheet is placed over the calendered mix and the wheel cut therefrom.

If the mix is formed in a mold, regenerated cellulose is placed between the mix and the surfaces of the mold. The regenerated cellulose prevents the mixture from adhering to the mold as otherwise the resin adheres to the mold or to any other surface with which it contacts. However, the sheets of cellophane or regenerated cellulose prevent any such adhering of the resin to adjacent surfaces.

Another advantage of the resin herein disclosed and made by the process herein set forth and which particularly adapts it for use as a bond for abrasive grain is that it is easy to incorporate metal oxides and clay and silica fillers in a finely divided state into the resin which further enhances its heat resistance.

Having thus set forth the nature of my invention, what I claim is:

1. The method of making a resin comprising melting from 40 to 200 grams of methoxy polyglycol and maintaining it in a liquid state, beating in from .4 to 4 grams of powdered lead oxide to uniformly suspend the latter in the melted methoxy polyglycol, mixing in from 30 to 70 grams of pentaerythritol to stiffen the mix to maintain the oxide in suspension, mixing from 50 to 130 grams of pentaerythritol with 400 grams of dimethyl terephthalate, adding part of the second mixture to the first mixture to render it of pasty consistency, charging the resulting mix into a reaction vessel and adding thereto and mixing therewith the remainder of the second mix, raising the temperature of the mix within said reaction vessel to 220° C. over a period of 2½ hours to obtain a vigorous reaction, thereafter continuing to raise the temperature of the contents of said reaction vessel for a period of 25 minutes to a temperature of 229° C. until the polymer is tacky, and then pouring the contents from said vessel into a destructible container.

2. The method of making an abrasive article comprising melting from 40 to 200 grams of methoxy polyglycol and maintaining it in a liquid state, beating in from .4 to 4 grams of powdered lead oxide to uniformly suspend the latter in the melted methoxy polyglycol, mixing in from 30 to 70 grams of pentaerythritol to stiffen the mix to maintain the oxide in suspension, mixing from 50 to 130 grams of pentaerythritol with 400 grams of dimethyl terephthalate, adding part of the second mixture to the first mixture to render it of pasty consistency, charging the resulting mix into a reaction vessel and adding thereto and mixing therewith the remainder of the second mix, raising the temperature of the mix within said reaction vessel to 220° C. over a period of 2½ hours to obtain a vigorous reaction, thereafter continuing to raise the temperature of the contents of said reaction vessel for a period of 25 minutes to a temperature of 229° C. until the polymer is tacky, then pouring the contents from said vessel into a destructible container, distributing abrasive grit in said resin in proportions of approximately five parts of grit to one part of resin, shaping articles of said mix, and curing said shaped article under heat.

3. The method of making an abrasive article comprising melting from 40 to 200 grams of methoxy polyglycol and maintaining it in a liquid state, beating in from .4 to 4 grams of powdered lead dioxide to uniformly suspend the latter in the melted methoxy polyglycol, mixing in from 30 to 70 grams of pentaerythritol to stiffen the mix to maintain the lead oxide in suspension therein, mixing from 50 to 130 grams of pentaerythritol with 400 grams of dimethyl terephthalate, adding part of the second mixture to the first mixture to render it of pasty consistency, charging the resulting mix into a reaction vessel and adding thereto and mixing therewith the remainder of the second mix, raising the temperature of the mix within said reaction vessel to 220° C. to obtain a vigorous reaction and continuing the application of heat to continue to raise the temperature of the mix until a polymer of tacky consistency is obtained, distributing abrasive grain through said tacky polymer, shaping articles of the resultant mixture, and finally heat curing said polymer.

4. A tacky dough-like resinous material which is the reaction product of dimethyl terephthalate, pentaerythritol, methoxy polyglycol and lead dioxide in proportions of 400 grams of dimethyl terephthalate, from 80 to 200 grams of pentaerythritol, from 40 to 200 grams of methoxy polyglycol and from .4 to 4 grams of lead dioxide reacted at temperature above 180° C. to a cohesive, tacky, dough-like stage.

5. An abrasive article comprising abrasive grains and a cured resin bonding said grains and comprising a reaction product of dimethyl terephthalate, pentaerythritol, methoxy polyglycol and lead dioxide in proportions of 400 grams of dimethyl terephthalate, from 80 to 200 grams of pentaerythritol, from 40 to 200 grams of methoxy polyglycol and from .4 to 4 grams of lead dioxide reacted at a temperature above 180° C. to a cohesive, tacky, dough-like stage.

6. An abrasive article comprising a backing sheet and abrasive grains bonded to a side of the sheet by a finally cured resin consisting of a reaction product of dimethyl terephthalate, pentaerythritol, methoxy polyglycol and lead dioxide in proportions of 400 grams of dimethyl terephthalate, from 80 to 200 grams of pentaerythritol, from 40 to 200 grams of methoxy polyglycol and from .4 to 4 grams of lead dioxide reacted at a temperature above 180° C. and finally cured.

HUGH V. ALLISON.

No references cited.